United States Patent
Kim et al.

(10) Patent No.: US 11,571,882 B2
(45) Date of Patent: Feb. 7, 2023

(54) LAMINATED FILM FOR BONDING AND LIGHT-TRANSMITTING LAMINATE INCLUDING SAME

(71) Applicant: SKC Co., Ltd., Suwon-si (KR)

(72) Inventors: Hyejin Kim, Suwon-si (KR); Kyuhun Kim, Seoul (KR); Sung Jin Chung, Seoul (KR); Haksoo Lee, Suwon-si (KR)

(73) Assignee: SKC Co., Ltd., Suwon-si (KR)

( * ) Notice: Subject to any disclaimer, the term of this patent is extended or adjusted under 35 U.S.C. 154(b) by 0 days.

(21) Appl. No.: 17/539,485

(22) Filed: Dec. 1, 2021

(65) Prior Publication Data

US 2022/0088908 A1    Mar. 24, 2022

Related U.S. Application Data

(63) Continuation of application No. PCT/KR2020/008177, filed on Jun. 23, 2020.

(30) Foreign Application Priority Data

Jun. 28, 2019 (KR) ........................ 10-2019-0077684

(51) Int. Cl.
| | | |
|---|---|---|
| *B32B 17/10* | (2006.01) | |
| *B32B 17/00* | (2006.01) | |
| *B32B 27/00* | (2006.01) | |
| *B32B 27/08* | (2006.01) | |
| *B32B 27/12* | (2006.01) | |
| *B32B 7/12* | (2006.01) | |
| *B32B 27/30* | (2006.01) | |
| *B60J 1/20* | (2006.01) | |
| *C03C 27/10* | (2006.01) | |
| *B32B 7/022* | (2019.01) | |
| *B32B 3/26* | (2006.01) | |

(52) U.S. Cl.
CPC ............ *B32B 27/306* (2013.01); *B32B 3/263* (2013.01); *B32B 7/022* (2019.01); *B32B 2250/03* (2013.01); *B32B 2250/246* (2013.01); *B32B 2307/102* (2013.01); *B32B 2307/412* (2013.01); *B32B 2307/558* (2013.01); *B32B 2307/732* (2013.01); *B32B 2605/006* (2013.01)

(58) Field of Classification Search
None
See application file for complete search history.

(56) References Cited

U.S. PATENT DOCUMENTS

2018/0319130 A1* 11/2018 Nishino ................. B60J 1/02

FOREIGN PATENT DOCUMENTS

| JP | 2005-68006 A | 3/2005 |
|---|---|---|
| JP | 2007-223883 A | 9/2007 |
| JP | 2017-7932 A | 1/2017 |
| KR | 10-1408392 B1 | 6/2014 |
| KR | 10-2016-0107154 A | 9/2016 |
| KR | 10-2018-0061189 A | 6/2018 |
| KR | 10-2018-0061190 A | 6/2018 |
| KR | 10-2018-0081157 A | 7/2018 |

OTHER PUBLICATIONS

International Search Report dated Oct. 20, 2020, in counterpart International Patent Application No. PCT/KR2020/008177 (2 pages in English and 2 pages in Korean).

* cited by examiner

*Primary Examiner* — Sheeba Ahmed
(74) *Attorney, Agent, or Firm* — NSIP Law

(57) ABSTRACT

The laminated film for bonding comprises: a first layer; a second layer disposed opposite to the first layer; and a third layer interposed between the first layer and the second layer, wherein the laminated film comprises a first end having a first thickness and a second end having a second thickness different from the first thickness, and a measuring area disposed between the first end and the second end and having a center thickness, wherein the center thickness is less than or equal to a middle value of the first thickness and the second thickness, wherein a penetration coefficient ($F_{pe}$) at the measuring area is 1.35 kgf/mm$^2$*mm or more, and wherein, a ratio of a sum of a thickness of the first layer and a thickness of the second layer to a thickness of the third layer is 100:12 to 24.

16 Claims, 5 Drawing Sheets

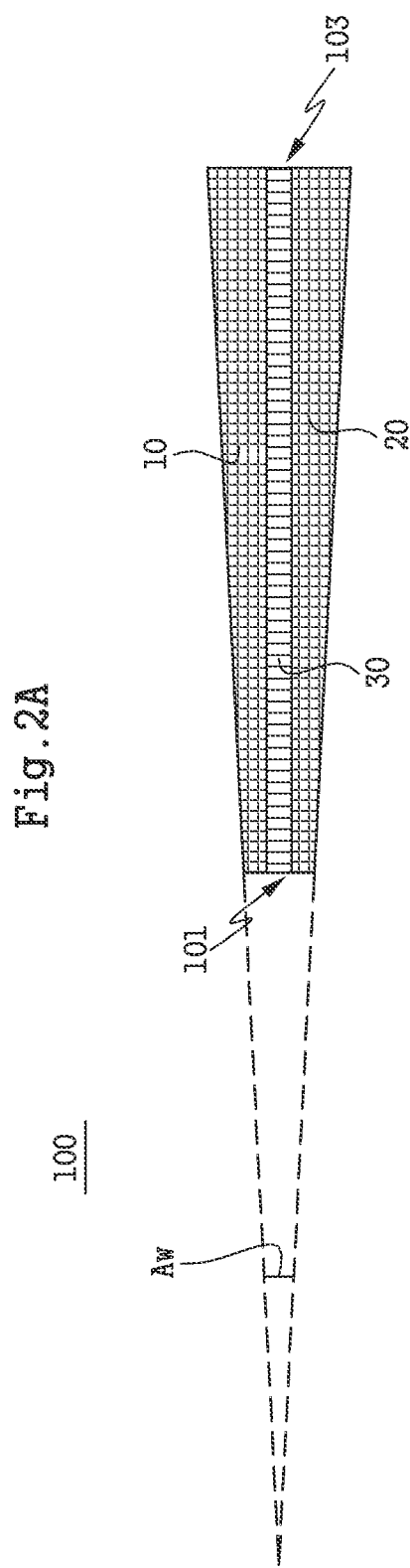

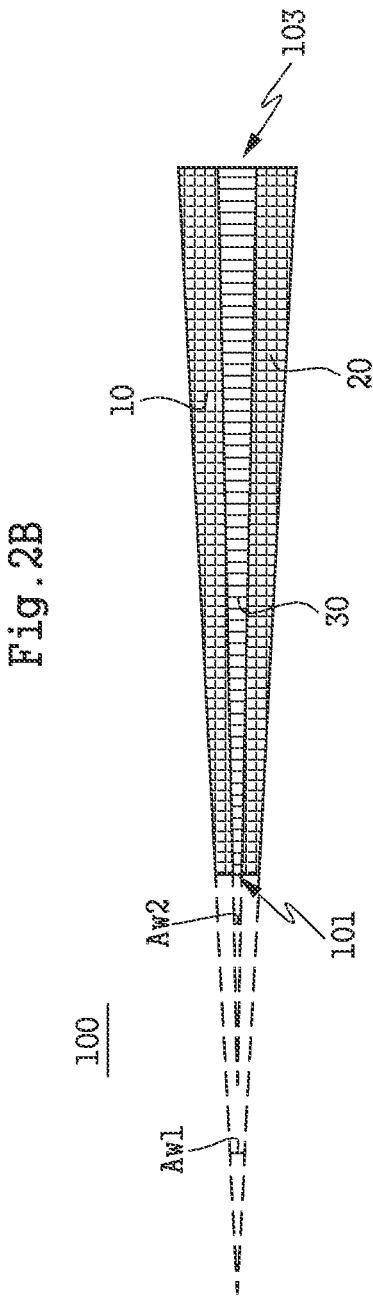

LAMINATED FILM FOR BONDING AND LIGHT-TRANSMITTING LAMINATE INCLUDING SAME

CROSS-REFERENCE TO RELATED APPLICATIONS

Pursuant to 35 USC 120 and 365(c), this application is a continuation of International Application No. PCT/KR2020/008177 filed on Jun. 23, 2020, and claims the benefit under 35 USC 119(a) of Korean Application No. 10-2019-0077684 filed on Jun. 28, 2019, in the Korean Intellectual Property Office, the entire disclosures of which are incorporated herein by reference for all purposes.

BACKGROUND

1. Field

Example embodiments relate to a laminated film for bonding having sound insulation performance and improved properties in penetration resistance, and a light transmitting laminate including same, which is usable as a windshield.

2. Description of Background

Polyvinyl acetal is used in laminated glass (safety glass) or an interlayer (a film for laminated glass) of a light transmission laminate. Laminated glass is mainly used in windows of architecture, cladding, and window glass of automobiles, and due to the characteristics, such as anti-scattering of glass fragments when broken, and penetration resistance against an impact of a certain strength, it can secure stability for minimizing damage or injury given to objects or people placed in the inside of the architecture or the automobiles.

Recently, Head Up Display (HUD) is being equipped in an automobile in many cases. In detail, when an image is reflected on a windshield of an automobile by a projector in a dashboard area or a roof area, this reflected image is perceived by a driver. Such a head up display can provide important data such as current driving information, navigation information, and warning message at the same time, even when a driver watches a road ahead, so that it can considerably contribute to convenience of driving and traffic safety.

Because a head up display reflects a projector image to a windshield of an automobile, the image is reflected in both surfaces (an inside surface and an outside surface) of the windshield, so that the head up display has a basic problem, which is that a driver is allowed to perceive not only a desired primary image but also a secondary image (ghost image) together in a weaker strength. For example, a method to solve this problem is to place an interlayer, which has a wedge-shaped vertical cross section, between a pair of glass.

As related art documents, Korean Patent No. 10-1408392, and Japanese Patent Publication No. 2017-007932 are present.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, the laminated film for bonding according to one embodiment includes: a first layer; a second layer disposed opposite to the first layer; and a third layer interposed between the first layer and the second layer, wherein the laminated film includes a first end having a first thickness, a second end opposite to the first end in a width direction of the laminated film and having a second thickness different from the first thickness, and a measuring area disposed between the first end and the second end and having a center thickness, which is a thickness at a center of the measuring area, wherein the center thickness is less than or equal to a middle value of the first thickness and the second thickness, wherein a penetration coefficient ($F_{pe}$) measured by the following Equation 1 at the measuring area is 1.35 kgf/mm²*mm or more:

$$F_{pe} = T_1 \times UTS + T_2 \times TS \qquad \text{[Equation 1]}$$

where, $F_{pe}$ is the penetration coefficient (kgf/mm²*mm), UTS is a sum of ultimate tensile strength (kgf/mm²) of the first layer at the measuring area and an ultimate tensile strength of the second layer at the measuring area, TS is a fracture tensile strength (kgf/mm²) of the third layer at the measuring area, $T_1$ is a sum (mm) of the center thickness of the first layer at the measuring area and the center thickness of the second layer at the measuring area, and $T_2$ is the center thickness (mm) of the third layer at the measuring area, and wherein a ratio of a sum of a thickness of the first layer and a thickness of the second layer to a thickness of the third layer is 100:12 to 24.

The first thickness may be thinner than the second thickness.

The thickness of the third layer at the first end may be thinner than the thickness of the third layer at the second end.

The laminated film for bonding may include a first surface and a second surface disposed opposite to the first surface, wherein the laminated film for bonding may include a first line and a second line, wherein the first line is a virtual line connecting the first end and the second end on the first surface, and the second line is a virtual line connecting the first end and the second end on the second surface, and wherein the angle at a point of contact of the first line and the second line may be 1 degree or less.

When the first thickness is 0% and the second thickness is 100%, the center thickness may be 35% or less.

A loss factor value at the measuring area may be 0.34 or more.

The laminated film for bonding may have a sound transmission loss value of 35.5 dB or more measured at 2000 Hz.

The thickness of the third layer at the first end may be 60 μm or more.

The sum of the thickness of the first layer at the first end and the thickness of the second layer at the first end may be above 560 μm.

The first layer or the second layer may include a polyvinyl acetal resin having a hydroxyl group of 15 wt % or more based on a total weight of the polyvinyl acetal resin.

The third layer may include a polyvinyl acetal resin having a hydroxyl group of 9.5 wt % or less based on a total weight of the polyvinyl acetal resin.

In another general aspect, the light transmitting laminate according to one embodiment includes: a first light transmission layer; the laminated film for bonding described above placed on one side of the first light transmission layer; and a second light transmission layer disposed on the laminated film for bonding.

The light transmitting laminate may have a sound transmission loss value of 35.5 dB or more measured at 2000 Hz.

The light transmitting laminate may not allow penetration to occur in a penetration resistance test of 5.5 m in accordance with KS L 2007.

BRIEF DESCRIPTION OF THE DRAWINGS

FIG. 2A and FIG. 2B are conceptual views for illustrating a structure of the laminated film for bonding according to one embodiment of the present disclosure by using cross sections thereof, respectively.

DETAILED DESCRIPTION

Figure 1:
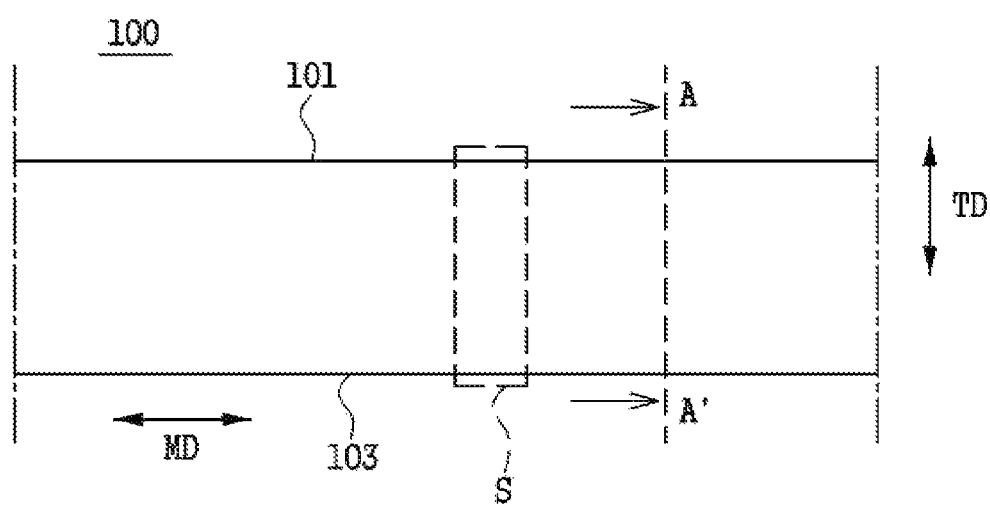
FIG. 1 is a conceptual view for illustrating the first end, the second end, and so on of the laminated film for bonding manufactured according to one embodiment of the present disclosure.

Hereinafter, example embodiments of the present disclosure will be described in detail with reference to the accompanying drawings so that they can be easily practiced by those skilled in the art to which the present invention pertains. The example embodiments may, however, be embodied in many different forms and is not to be construed as being limited to the embodiments set forth herein. Like reference numerals designate like elements throughout the specification.

In the present disclosure, terms for degree like "about", "substantially" and so on are used for meaning values approximative from/to the value when a tolerance to be proper to referred meaning for manufacture and substance is presented. Additionally, these terms for degree are used to help understand example embodiments and to prevent the presented content in which exact or absolute number is referred from being unjustly used by unconscionable trespassers.

Throughout the present disclosure, the phrase "combination(s) thereof" included in a Markush-type expression denotes one or more mixtures or combinations selected from the group consisting of components stated in the Markush-type expression, that is, denotes that one or more components selected from the group consisting of the components are included.

Throughout the present disclosure, "A and/or B" means "A, B, or A and B".

Throughout the present disclosure, terms such as "first," "second," "A," or "B" are used to distinguish the same terms from each other. The singular forms "a," "an," and "the" include the plural form unless the context clearly dictates otherwise.

In the present disclosure, "B being placed on A" means that B is placed in direct contact with A or placed over A with another layer or structure interposed therebetween and thus should not be interpreted as being limited to B being placed in direct contact with A, unless the description clearly dictates.

In the present disclosure, a singular form is contextually interpreted as including a plural form as well as a singular form unless specially stated otherwise.

In the present disclosure, a size of each component of a drawing can be exaggerated and different from a size to be actually applied.

In the present disclosure, an amount of hydroxyl group was evaluated by a method of measuring an amount of ethylene group in which the hydroxyl group of the polyvinyl acetal resin is being chemically bonded in accordance with JIS K6728.

In the present disclosure, ultimate tensile strength and fracture tensile strength are evaluated by the result of measuring a sample prepared by using a punching device manufactured according to ASTM D 638 standard through a tensile tester. In the present disclosure, the values of ultimate tensile strength and fracture tensile strength are distinct from each other, however, the values of ultimate tensile strength and fracture tensile strength can be the same from each other depending on properties of a sample. For example, in a case of a third layer having comparatively thin thickness, the third layer has a characteristic of being easily fractured during a standard evaluation, and ultimate tensile strength and fracture tensile strength may be of the same value.

An object of example embodiments is to provide a laminated film for bonding having sound insulation performance, anti-double-image functionality, and the like and improved properties in penetration resistance, and a light transmitting laminate including the same.

The laminated film for bonding, and the light transmitting laminate including the same of the present disclosure may provide a laminated film and a light transmitting laminate including the same having sound insulation performance, anti-double-image functionality, and the like, and at the same time, being excellent in penetration resistance.

A laminated film for bonding whose cross section is a wedge shape has an advantage of providing anti-double-image functionality to a light transmission laminate. However, a problem of degradation of mechanical properties such as penetration resistance in a thin portion present in one end of a laminated film for bonding may occur due to properties of the wedge shape. In a case of a film which is a laminated film for bonding having anti-double-image functionality and simultaneously having sound insulation performance, properties thereof such as penetration resistance may be lowered compared to a film not having a sound insulating layer, and this can be a problem of difficulties in having a sufficient stability when a light transmitting laminate including the laminated film for bonding is utilized as a windshield and the like. As the result of repetitive experiments, the inventors of the present disclosure have verified that, when a laminated film for bonding satisfies a certain characteristic, which is the penetration coefficient described below, a light transmitting laminate can satisfy a sound insulation characteristic and a penetration resistance characteristic at the same time, and thus completed this examples.

The present disclosure discloses the laminated film for bonding, which is particularly advantageous for being applied to a laminated film having a wedge-shaped cross section, whose one end is formed to be thinner than the other end, satisfies a sound insulation characteristic and a penetration resistance characteristic by a method of adjusting an amount of hydroxyl group included in a skin layer and controlling a thickness of a core layer, and has a head up display functionality with being applicable in a comparatively thin thickness.

Figure 3:
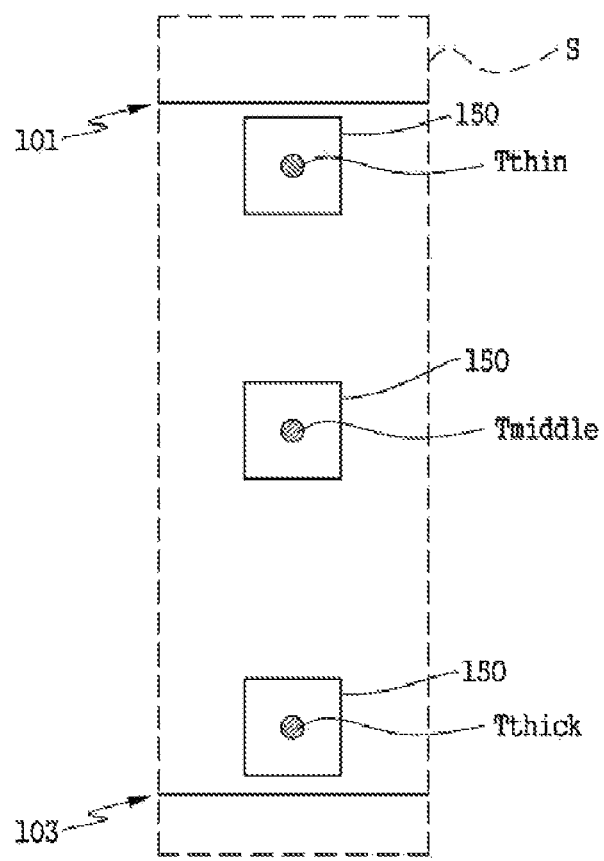
FIG. 3 is a drawing for illustrating the measuring area of the laminated film for bonding according to one embodiment of the present disclosure.

FIG. 1 is a conceptual view for illustrating the first end, the second end, and so on of the laminated film for bonding manufactured according to one embodiment of the present disclosure. FIG. 2A and FIG. 2B are conceptual views for illustrating the structure of the laminated film for bonding according to one embodiment of the present disclosure by using cross sections thereof respectively. FIG. 3 is a drawing for illustrating the measuring area of the laminated film for bonding according to one embodiment of the present disclosure. With reference to the FIGS. 1 to 3, the present disclosure will be described in further detail.

In a general aspect, the laminated film for bonding 100 according to one embodiment of the present disclosure includes: a first layer 10; a second layer 20 disposed opposite to the first layer 10; and a third layer 30 interposed between the first layer 10 and the second layer 20, and in the laminated film 100, the first end 101 and the second end 103 are different in the thickness, the measuring area 150 is included, the measuring area 150 has the center thickness, the center thickness is the middle value or less between the thickness at the first end 101 and the thickness at the second end 103, and the penetration coefficient ($F_{pe}$) measured by the following Equation 1 at the measuring area 150 is 1.35 kgf/mm$^2$*mm or more.

$$F_{pe} = T_1 \times UTS + T_2 \times TS \quad \text{[Equation 1]}$$

where, $F_{pe}$ is the penetration coefficient (kgf/mm$^2$*mm), UTS is a sum of an ultimate tensile strength (kgf/mm$^2$) of the first layer 10 at the measuring area 150 and an ultimate tensile strength of the second layer 20 at the measuring area 150, TS is a fracture tensile strength (kgf/mm$^2$) of the third layer 30 at the measuring area 150, $T_1$ is a sum (mm) of the center thickness of the first layer 10 at the measuring area 150 and the center thickness of the second layer 20 at the measuring area 150, and 12 is a center thickness (mm) of the third layer at the measuring area 150.

In detail, the penetration coefficient value may be 1.36 kgf/mm$^2$*mm or more, or 1.40 kgf/mm$^2$*mm or more. The measuring area 150 having such a penetration value can have more excellent penetration resistance.

The laminated film for bonding 100 may have a wedge shape, whose first end 101 and second end 103 are different in the thickness.

In detail, the thickness of the first end 101 may be thinner than the thickness of the second end 103.

The third layer 30 may be substantially parallel when a cross section thereof is observed in a TD direction (refer to FIG. 2A).

The third layer 30 may have a cross section in a wedge shape when observed in a TD direction.

The thickness of the third layer 30 at the first end 101 may be thicker than the thickness of the third layer 30 at the second end 103 (not shown).

The thickness of the third layer 30 at the first end 101 may be thinner than the thickness of the third layer 30 at the second end 103 (refer to FIG. 2B).

The latter case has a more advantageous characteristics in penetration resistance than the former case.

The laminated film for bonding 100 includes a first surface (not shown) as one side and a second surface as the other side (not shown).

The laminated film for bonding 100 includes a first line (not shown); and a second line (not shown), wherein the first line is a virtual line connecting the first end and the second end of the first surface, and the second line is a virtual line connecting the first end and the second end of the second surface.

The angle (wedge angle, Aw and Aw1) at a point of contact of the first line and the second line may be 0.01 degree of more, or 0.02 degree or more. The angle at a point of the first line and the second line may be 1 degree or less, or 0.8 degree or less. When having a wedge angle in these ranges, it is possible to have an anti-double-image effect in a distance of 1 to 2 m from a light transmitting laminate including the laminated film for bonding, and an excellent HUD (head up display) functionality, when utilized as a windshield and the like.

The third layer 30 includes a 3-1 surface (not shown) as one side and a 3-2 surface (not shown) as the other side.

The third layer 30 includes a 3-1 line (not shown); and a 3-2 line (not shown), wherein the 3-1 line is a virtual line connecting the first end and the second end of the 3-1 surface, and the 3-2 line is a virtual line connecting the first end and the second end of the 3-2 surface.

The angle (wedge angle, Aw2) at a point of contact of the 3-1 line and the 3-2 line may be 1 degree or less, or 0.8 degree or less. Also, the angle (wedge angle, Aw2) at a point of contact of the 3-1 line and the 3-2 line may be 0.01 degree or more, or 0.02 degree or more.

The measuring area 150 refers to a piece of film in a certain size obtained from the laminated film for bonding 100, and is sampled based on a center thickness, which is a thickness at the center (T) thereof.

When the thickness of the first end 101 is 0% and the thickness of the second end 103 is 100%, the center thickness (T) may be 50% or less, or 35% or less.

When the thickness of the first end 101 is 0% and the thickness of the second end 103 is 100%, the center thickness (T) may be 20% or less, or 5 to 10%.

These mean that penetration coefficient is measured by selecting a thinner portion as the measuring area, thus are more advantageous for evaluating the minimum value of penetration resistance properties in the overall film.

The measuring area 150 may be sampled from the laminated film for bonding 100 in a proper size for measuring a tensile strength. In detail, the measuring sample as the measuring area 150 can be obtained by the method of sampling described below, and the tensile strength thereof can be measured.

1) Conditioning Process: The measuring area 150 may be obtained after conditioning the laminated film for bonding 100. The conditioning process may be carried out as a process of keeping the laminated film 100 for bonding for 24 hours or more in a condition of a relative humidity of 20% at 20° C. The conditioning process is performed for minimizing that environment, temperature, humidity, and so on, under which the laminated film for bonding is kept, affect the measured result.

2) Sampling—Thickness Measuring Process: A portion for measuring penetration coefficient is selected within the laminated film for bonding 100 and taken as a measuring sample. At this time, the measuring sample may be in a size of width and length of 1 cm, respectively. In detail, the sampling—thickness measuring process includes a center thickness measuring process, a stabilizing process, and a thickness checking process in this order.

2-1) Center Thickness Measuring Process: A cross section of the measuring sample is observed, and the thickness of each layer is measured. In detail, the laminated film for bonding is cut in a cross-section direction in a thickness of 1.0 mm to 5.0 mm to include a center portion of the measuring sample, thereby cross section measuring sample is prepared.

2-2) Stabilizing Process: The cross section measuring sample is allowed to be stabilized. The stabilizing may be carried out in the method of keeping the sample for 30 minutes or more in an atmosphere of relative humidity of 20% at 20° C. as a process for minimizing a measurement error caused from shrinking rate.

2-3) Thickness Checking Process: The measuring sample after stabilizing process in this manner was observed for the cross section thereof with an optical microscope to check the center thickness of each layer.

The center thickness may be measured by using Mitsutoyo 547-401 thickness gauge, but the present disclosure is not limited thereto.

The measuring sample sampled in this manner is measured for ultimate tensile strength of the first layer 10 and the second layer 20 and fracture tensile strength of the third layer 30, respectively (tensile strength measuring process).

The ultimate tensile strength and the fracture tensile strength may be measured by using tensile property measuring device. For example, a tensile strength measuring sample is sampled in a quadrangle shape with 3 cm×15 cm (width×length) based on the center thickness to be similar to the above description, and ultimate tensile strength and fracture tensile strength may be respectively measured by utilizing the tensile strength measuring sample and a measuring device of 5566A model available from INSTRON in a tensile mode.

When the laminated film for bonding 100 is a form, in which all the first layer 10, the second layer 20, and the third layer 30 are laminated and not separated, tensile strength may be measured after separating these three layers from each other. In detail, a sample with 30 mm×150 mm (width× length) is taken and the three layers are separated from each other, and then an ultimate tensile strength value of the first layer 10, an ultimate tensile strength value of the second layer 20, and the fracture tensile strength of the third layer 30 are measured, respectively. When the third layer 30 is separated from the laminated film for bonding 100, the third layer 30 may not be separated clearly or may be damaged in the form. In this case, the damaged third layer may be processed in a film form by a hot press to be applied to measuring fracture tensile strength.

The penetration coefficient may be calculated by the method such as described below (penetration coefficient evaluation process).

The ultimate tensile strength of the first layer 10, the ultimate tensile strength of the second strength of the second layer 20, and the fracture tensile strength of the third layer 30 may be used to calculate the penetration coefficient according to Equation 1.

As an alternative way, the sum of an ultimate tensile strength of the first layer 10 and an ultimate tensile strength of the second layer 20 and a fracture tensile strength of the third layer 30 may be obtained from a tensile test table. In detail, respective compositions for the first layer 10, the second layer 20, and the third layer 30 are manufactured into film samples in a size of 30 mm×150 mm (width×length) having different thicknesses by a method of hot press and the like, and respective ultimate tensile strength values and a fracture tensile strength value corresponding to the thickness measured above or an approximate value of the thickness may be taken to be applied as the ultimate tensile strength value and the fracture tensile strength value in the above Equation 1.

The laminated film for bonding 100 may include a first layer 10 and a second layer 20 directly contacting with a bonding target like glass, and a third layer 30 not directly contacting with the bonding target, wherein the third layer 30 may be a sound insulating layer.

The laminated film for bonding 100 may be manufactured into a light transmitting laminate (laminated glass) by taking the measuring area 150, and determining loss factor or sound transmission loss of the light transmitting laminate may be carried out. At this time, the measuring area 150 manufactured into the measuring sample for determining loss factor or sound transmission loss may be conditioned using similar method described above, and then is manufactured into a sample, which is prepared by taking some of the laminated film based on the center thickness (for example, 30 cm in a TD direction and 2.5 cm in a MD direction after measuring a center thickness in the TD direction) and bonding it between two pieces of glass having a thickness of 2.1 T (hereinafter, mm) using a conventional method.

For example, to bond the sample, the sample may be interposed between two pieces of clear glass (length of 30 cm, width of 2.5 cm, and thickness of 2.1 T), be vacuum laminated for 30 seconds in a laminator at 110° C. and an atmospheric pressure of 1 to pre-press the laminated glass, and be pressurized for 20 minutes in an autoclave at 140° C. and a pressure of 1.2 MPa. For measuring the loss factor value, the sample was stabilized in a constant temperature and humidity chamber at 20° C. and a relative humidity of 20% to measure sound insulation performance.

The laminated film for bonding 100 may have a loss factor value of 0.34 or more measured at the measuring area 150. Particularly, the measuring area 150 for measuring the loss factor value may have a center thickness of 35%, or 10%, when the thickness of the laminated film for bonding at the first end 101 is designated as 0%, and the thickness of the laminated film for bonding at the second end 103 is designated as 100%. When a loss factor value measured at such a position satisfies the above condition, excellent sound insulation performance can be obtained even in a film corresponding to a thin portion of a wedge shape.

The laminated glass (glasses of 2.1 T are applied to both ends of the laminated film, respectively, and T refers to mm) bonded with the laminated film for bonding 100 may have a sound transmission loss (STL) value of 35.5 dB or more measured at 2000 Hz. In detail, the laminated film for bonding 100 may have a sound transmission loss evaluation value of 35.5 dB or more, or 35.8 dB or more, which is evaluated by constructing the laminated glass manufactured in a size of 1230 mm×1480 mm according to KSF 2808: 2011 standard into a wall with the corresponding standard and placing it in a center of a sound room. Such a sound transmission loss value may be considered as a value having the greatest difference compared to a sound transmission loss value of a conventional film, and means that the laminated film of the present disclosure has excellent sound insulation performance.

The first layer 10 may include a polyvinyl acetal resin, or may include a polyvinyl acetal resin and a plasticizer.

The first layer 10 may include a polyvinyl acetal resin in an amount of 60 to 76 wt %, 70 to 76 wt %, or 71 to 74 wt % based on a total weight of the first layer 10. When including the polyvinyl acetal resin in this range, the laminated film for bonding 100 may have a comparatively high tensile strength and modulus.

The polyvinyl acetal resin included in the first layer 10 may have an acetyl group in an amount of less than 2 wt %, and in detail, 0.01% or more and less than 1.5 wt % based on a total weight of the polyvinyl acetal resin. The polyvinyl acetal resin included in the first layer 10 may have a hydroxyl group in an amount of 15 wt % or more, 16 wt % or more, or 19 wt % or more based on a total weight of the polyvinyl acetal resin. Also, the polyvinyl acetal resin included in the first layer may have a hydroxyl group in an amount of 30 wt % or less based on a total weight of the polyvinyl acetal resin.

When the polyvinyl acetal resin has these characteristics, the first layer 10 may have proper mechanical properties such as penetration resistance while being excellently bonded with a material like glass.

The polyvinyl acetal resin included in the first layer 100 may be a polyvinyl acetal resin obtained by acetalization of a polyvinyl alcohol having a polymerization degree of 1,600 to 3,000 with aldehyde, or may be a polyvinyl acetal resin obtained by acetalization of a polyvinyl alcohol having a polymerization degree of 1,700 to 2,500 with aldehyde. When such a polyvinyl acetal resin is included, mechanical properties like penetration resistance can be sufficiently improved.

The polyvinyl acetal resin may be synthesized from polyvinyl alcohol and aldehyde, and the type of aldehyde is not limited. In detail, the aldehyde may be selected from the group consisting of n-butyl aldehyde, isobutyl aldehyde, n-valer aldehyde, 2-ethyl butyl aldehyde, n-hexyl aldehyde, and a mixture thereof. When n-butyl aldehyde is applied as the aldehyde, the resulting polyvinyl butyral resin may have a refractive index, whose difference with a refractive index of glass is small, and may have excellent adhesion with glass and the like.

The first layer 10 may include the plasticizer in an amount of 24 to 40 wt %, 24 to 30 wt %, or 26 to 29 wt % based on a total weight of the first layer 10. When the plasticizer is included in this range, the laminated film for bonding may have proper adhesion and impact resistance.

In detail, the plasticizer may be selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibutoxyethoxyethyl adipate (DBEA), butyl carbitol adipate (DBEEA), dibutyl sebacate (DBS), bis 2-hexyl adipate (DHA) and a combination thereof. Specifically, the plasticizer may be selected from the group consisting of triethylene glycol di-2-ethyl butyrate, triethylene glycol di-2-ethylhexanoate, triethylene glycol di-n-heptanoate, and a combination thereof. More specifically, triethylene glycol bis 2-ethylhexanoate (3G8) may be used as the platicizer.

The second layer 20 may include a polyvinyl acetal, a plasticizer, and the like, that are the same as the description on the first layer 10. The detailed description of the second layer 20 is overlapped with that of the first layer 10, and thus further description is omitted.

The third layer 30 may include a polyvinyl acetal resin, or a polyvinyl acetal resin and a plasticizer.

The third layer 30 may include a polyvinyl acetal resin in an amount of 58 to 68 wt %, or 63 to 68 wt % based on a total weight of the third layer 30. When including the polyvinyl acetal resin in this range, the laminated film 100 may have a mechanical strength in a proper level and simultaneously may have a comparatively excellent sound insulation characteristic.

The polyvinyl acetal resin included in the third layer 30 may have an acetyl group in an amount of 8 wt % or more, and in detail, 8 to 15 wt % based on a total weight of the polyvinyl acetal resin. The polyvinyl acetal resin included in the third layer 30 may have a hydroxyl group in an amount of 9.5 wt % or less, 9.0 wt % or less, or 8.7 wt % or less based on a total weight of the polyvinyl acetal resin. Also, the polyvinyl acetal resin included in the third layer 30 may have a hydroxyl group in an amount of 3 wt % or more based on a total weight of the polyvinyl acetal resin.

When including a polyvinyl acetal resin having these characteristics, the third layer 30 may include a plasticizer in a proper level, may show a sufficient sound insulation characteristic, and may control a migration phenomenon of the plasticizer.

The third layer 30 may include a plasticizer in an amount of 32 to 42 wt %, or 32 to 37 wt % based on a total weight of the third layer 30. When including a plasticizer in this range, the laminated film for bonding 100 may have proper sound insulation performance and mechanical properties.

The detailed description on a polyvinyl acetal resin and a plasticizer included in the third layer 30 is overlapped with the description on the first layer 10 and thus further description is omitted.

At least one or more layers among the first layer 10, the second layer 20, and the third layer 30 may further include an additive described below within a required range. The additive may be selected from the group consisting of an antioxidant, a heat stabilizer, a UV absorber, a UV stabilizer, an IR absorber, a glass adhesion regulator, and a combination thereof.

As an antioxidant, a hindered amine-based antioxidant or a hindered phenol-based antioxidant may be used. Specifically, during the process of manufacturing polyvinyl butyral (PVB), which needs a processing temperature of 150° C. or higher, a hindered phenol-based antioxidant is further preferable. The hindered phenol-based antioxidant may, for example, be Irganox 1976, 1010, and so on, which is available from BASF SE.

As a heat stabilizer, a phosphite-based heat stabilizer may be used considering suitability with an antioxidant. The heat stabilizer may, for example, be Irgafos 168 available from BASF SE.

As a UV absorber, Chemisorb 12, Chemisorb 79, Chemisorb 74, or Chemisorb 102 available from CHEMIPRO KASEI KAISHA, LTD may be used, or Tinuvin 328, Tinuvin 329, or Tinuvin 326 available from BASF SE may be used. As a UV stabilizer, Tinuvin available from BASF SE may be used. As an IR absorber, ITO, ATO, or AZO may be used, and as a glass adhesion regulator applied to a skin layer, a metal salt such as magnesium (Mg), potassium (K), sodium (Na); epoxy-based modified silicon (Si) oil; or a mixture thereof may be used, but the present disclosure is not limited thereto.

The ratio (thickness ratio) of the sum of the thickness of the first layer 10 and the thickness of the second layer 20 to the thickness of the third layer 30 may be 100:9 to 30, or 100:12 to 24. When the above ratio is less than 9, sound insulation performance of a laminated film may not sufficient, and when the above ratio is more than 30, mechanical properties such as penetration resistance of the laminated film for bonding may be degraded.

The thickness of the third layer 30 at the first end 101 may be 60 μm or more, 70 μm or more, 80 μm or more, or 90 μm or more. The thickness of the third layer 30 at the first end 101 may be 200 μm or less, 180 μm or less, or 140 μm or less. When preparing the third layer 30 having such thickness, it is possible to provide the laminated film for bonding 100 satisfying penetration resistance and sound insulation at the same time and having a comparatively thin thickness.

The sum of the thickness of the first layer 10 and the thickness of the second layer 20 at the first end 101 may be more than 560 μm, may be 575 μm or more, or may be 590 μm or more.

The thickness of the laminated film for bonding 100 at the first end may be 600 μm or more, may be 700 μm or more, may be 900 μm or less, or may be 850 μm or less.

When the laminated film for bonding 100 has a thickness as the above at the first end 101, the film is more advantageous for satisfying a sound insulation characteristic and a penetration resistance characteristic at the same time with having an anti-double-image characteristic.

The thickness of the laminated film for bonding 100 at the second end 103 may be 950 μm or more, or 1100 μm or more. Also, the thickness of the laminated film for bonding 100 at the second end 103 may be 1300 μm or less, or 1250 μm or less.

When the laminated film for bonding 100 has such thickness at the second end 103, the film may have a more excellent mechanical strength and excellent anti-double-image functionality.

Figure 4:
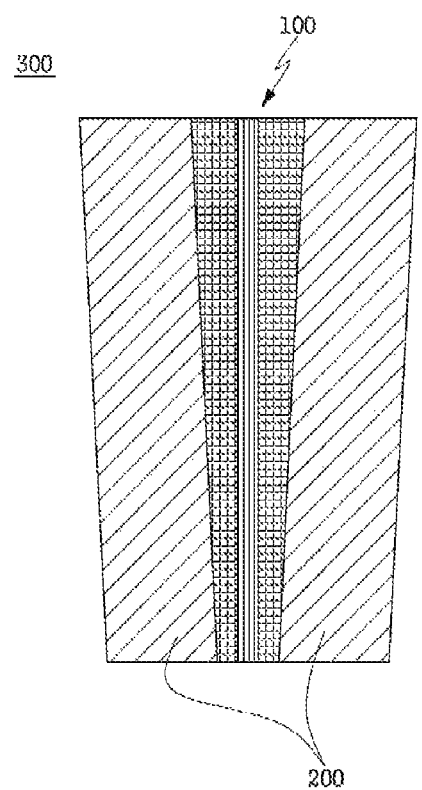
FIG. 4 is a conceptual view for illustrating the light transmitting laminate according to another embodiment of the present disclosure by using a cross section thereof.

FIG. 4 is a conceptual view for illustrating the light transmitting laminate according to another embodiment of the present disclosure by using a cross section thereof. With reference to FIG. 4, a more detailed description on the light transmission laminate will be made.

The light transmitting laminate 300 according to another embodiment of the present disclosure includes a first light transmission layer 200; a laminated film for bonding 100 disposed on one side of the first light transmission layer 200; and a second light transmission layer 200 placed on the laminated film for bonding 100.

The first light transmission layer 200 and the second light transmission layer 200 may be independently a light transmission glass, or a light transmission plastic.

The detailed description on the laminated film for bonding 100 is overlapped with the above description and thus further description is omitted.

The light transmitting laminate 300 has light transmission layers at both surfaces bonded by the laminated film for bonding 100 and can have properties required to safety glass such as impact resistance and penetration resistance, while maintaining light transmission properties of the first light transmission layer 200 and the second light transmission layer 200 at the nearly same level.

The light transmitting laminate 300 may satisfy an impact resistance characteristic in accordance with KS L 2007: 2008.

The light transmitting laminate 300 may satisfy a penetration resistance characteristic in accordance with KS L 2007. In detail, the light transmitting laminate 300 may not allow penetration to occur in a penetration resistance test of 5.5 m in accordance with KS L 2007.

The light transmitting laminate 300 may further have a sound insulation characteristic, and in detail, may have a sound transmission loss value of 35.5 dB or more measured at 2000 Hz.

The light transmitting laminate 300 has excellent functionality when applied as glass of automobiles, cladding of architecture, and the like. Particularly, when applied as a windshield of automobiles, it is possible to provide a laminated film for bonding 100 having all the characteristics of penetration resistance, sound insulation performance, and anti-double-image functionality with comparatively thin thickness, and a light transmitting laminate 300 including the same.

A vehicle (not shown) according to another embodiment in the present disclosure includes the light transmitting laminate 300 described above as a windshield. The vehicle includes a body forming a main body of the vehicle, a driver (engine, etc.) attached to the body, a drive wheel attached to be rotatable to the body, a connector connecting the drive wheel and the driver; and a windshield attached to a part of the body, which is the light transmitting laminate for blocking wind from outside.

Any vehicle including a windshield may be the vehicle. For example, the vehicle may be an automobile, and the body, the driver, the drive wheel, the connector and so on may be included without limit such that any component generally applied to an automobile may be applied thereto.

Hereinafter, the present disclosure will be described in further detail by specific embodiments. The below embodiments are for illustration only and the scope of the present disclosure is not limited thereto. In the description of below experiments, a case of mentioning "%" with being unclear in the unit to be unclear whether is wt % or mol % refers to wt %.

Manufacture Example

Each ingredient used in below examples and comparative examples are described as follows:

Polyvinyl Butyral Resin (A): PVA and n-BAL having a polymerization degree of 1700 and a saponification degree of 99 were added to be used in performing a general synthesizing process and thereby a polyvinyl butyral resin having a hydroxyl group of 19.1 wt %, a butyral group of 79.1 wt %, and an acetyl group of 0.8 wt % was obtained.

Polyvinyl Butyral Resin (B): PVA and n-BAL having a polymerization degree of 1700 and a saponification degree of 99 were added to be used in performing a general synthesizing process and thereby a polyvinyl butyral resin having a hydroxyl group of 22.0 wt %, a butyral group of 77.2 wt %, and an acetyl group of 0.8 wt % was obtained.

Polyvinyl Butyral Resin (C): PVA and n-BAL having a polymerization degree of 1700 and a saponification degree of 99 were added to be used in performing a general synthesizing process and thereby a polyvinyl butyral resin having a hydroxyl group of 16.8 wt %, a butyral group of 82.4 wt %, and an acetyl group of 0.8 wt % was obtained.

Polyvinyl Butyral Resin (D): PVA and n-BAL having a polymerization degree of 2400 and a saponification degree of 88 were added to be used in performing a general synthesizing process and thereby a polyvinyl butyral resin having a hydroxyl group of 8.6 wt %, a butyral group of 79.8 wt %, and an acetyl group of 11.5 wt % was obtained.

Preparation of Additive (1): Irganox 1010 as an antioxidant of 0.1 parts by weight, Tinuvin 328 as a UV absorber of 0.2 parts by weight, Mg Acetate as an adhesion regulator of 0.03 part by weight were mixed to be sufficiently dispersed in a tumbler (the sum of 0.33 parts by weight).

Preparation of Additive (2): Irganox 1010 as an antioxidant of 0.1 parts by weight, Tinuvin 328 as a UV absorber of 0.2 parts by weight, Mg Acetate as an adhesion regulator of 0.06 part by weight were mixed to be sufficiently dispersed in a tumbler (the sum of 0.36 parts by weight).

Preparation of Additive (3): Irganox 1010 as an antioxidant of 0.1 parts by weight, Tinuvin 328 as a UV absorber of 0.2 parts by weight, Mg Acetate as an adhesion regulator of 0.12 part by weight were mixed to be sufficiently dispersed in a tumbler (the sum of 0.42 parts by weight).

Manufacture of Laminated Film

The composition for the first layer and the second layer and the composition for the third layer were respectively put into an extruder a and an extruder b, which are twin-screw extruders, in types and amounts presented in Table 1 below to be extruded, and subsequently manufactured into films, whose first end had a thickness of 650 μm and whose second end had a thickness of 1300 μm through a T-die to have a width of 1.3 m.

TABLE 1

| (Parts by Weight) | First Layer Resin* Type | First Layer Resin* Amount | First Layer Plasticizer* | First Layer Additive* Type | First Layer Additive* Amount | Third Layer Resin Type | Third Layer Resin Amount | Third Layer Plasticizer |
|---|---|---|---|---|---|---|---|---|
| Example 1 | A | 70.64 | 27 | 2 | 0.36 | D | 65 | 35 |
| Example 2 | B | 69.58 | 27 | 3 | 0.42 | D | 65 | 35 |
| Example 3 | C | 71.67 | 27 | 1 | 0.33 | D | 65 | 35 |
| Example 4 | A | 70.64 | 27 | 2 | 0.36 | D | 65 | 35 |
| Example 5 | A | 70.64 | 27 | 2 | 0.36 | D | 65 | 35 |
| Example 6 | A | 70.64 | 27 | 2 | 0.36 | D | 65 | 35 |
| Comparative Example 1 | A | 70.64 | 27 | 2 | 0.36 | D | 65 | 35 |

*The same resin in the same amount (parts by weight) was applied to the first layer and the second layer.
*The same plasticizer in the same amount (parts by weight) was applied to the first layer and the second layer.
*The same additive in the same amount (parts by weight) was applied to the first layer and the second layer.

Property Evaluation of Laminated Film (1) Method for Measuring Penetration Resistance The manufactured laminated film was cut in a length direction of 50 cm for conditioning thereof for 24 hours or more at 20° C. and a relative humidity of 20%, and subsequently, sampling thereof was performed in an atmosphere adjusted to be 20° C. and a relative humidity of 20%. After sampling in respective width and length of 1 cm, the cross sections were observed with an optical microscope, and thereby the thickness of each layer and the position of sampling for tensile property evaluation were checked.

Portions respectively having thicknesses of 700 μm ($T_{thin}$), 900 μm ($T_{middle}$), and 1200 μm ($T_{thick}$) from a total width were checked. Subsequently, by taking each portion as a center, samples in a quadrangle shape of 3 cm×15 cm were cut and prepared using a punching device manufactured according to ASTM D 638 standard. The samples prepared in this manner were separated into the first layer, the second layer, and the third layer and then tensile property evaluation thereof was performed. In the separating process, the third layer damaged in the form was fixed in a film form by a hot press and then tensile property evaluation thereof was performed. Evaluation of tensile properties was carried out in a tensile mode by using a 5566 A model available from ISTRON. The sum of the ultimate tensile strength of the first layer and the tensile strength of the second layer, and the fracture tensile strength of the third layer that were evaluated were calculated by the Evaluation 1 above together with the center thicknesses of respective samples below and presented in Table 2 below.

(2) Penetration Resistance Evaluation (Preparation of Samples)

The manufactured laminated film was cut in a length direction of 50 cm for conditioning thereof at 20° C. and a relative humidity of 20%. Subsequently, sampling thereof was performed in an atmosphere adjusted to be 20° C. and a relative humidity of 20%. Portions respectively having thicknesses of 700 μm ($T_{thin}$), 900 μm ($T_{middle}$), and 1200 μm ($T_{thick}$) from a total width were checked, and by taking each portion as a center, samples in a size of 30 cm×30 cm were respectively obtained.

(Preparation of Laminated Glass)

The samples prepared as above were interposed between two pieces of clear glass (length of 10 cm, width of 10 cm, and thickness of 2.1 T) and vacuum lamination thereof was performed for 30 seconds in a laminator at 110° C. and an atmospheric pressure of 1 to pre-press laminated glass. All works up to here were carried out in a conditioning room at 20° C. and a relative humidity of 20%.

The pre-pressed samples were pressed for 20 minutes in an autoclave in a condition of a temperature of 140° C. and a pressure of 1.2 MPa and thereby laminated glass, which was main-laminated, was obtained and used for subsequent evaluations.

(Evaluation)

Aging of the laminated glass, which is main-laminated and manufactured as above, proceeded for 24 hours at 20° C. and a relative humidity of 20%, and subsequently, penetration resistance evaluation was performed at room temperature according to KS L 2007 standard. That was, the penetration evaluation was performed by dropping a metal sphere of 2270 g at a room temperature (20° C.) at a reference height of 5.5 m. It was expressed as Pass if penetration did not occur or expressed as Fail if penetration occurred.

(3) Sound Insulation Performance (L/F) Evaluation (Preparation of Samples/Preparation of Laminated Glass)

Portions corresponding to reference thicknesses of 700 μm ($T_{thin}$), 900 μm ($T_{middle}$), and 1200 μm ($T_{thick}$) in a width direction was found from the manufactured laminated film, and each of them was cut in a size of length of 30 cm and width of 2.5 cm to be interposed between two pieces of clear glass (length of 30 cm, width of 2.5 cm, and thickness of 2.1 T). Vacuum lamination thereof was performed for 30 seconds in a laminator at 110° C. and an atmospheric pressure of 1 to pre-press laminated glass, and after that, main lamination was performed by pressing the pre-pressed laminated glass for 20 minutes in an autoclave in a condition of a temperature of 140° C. and a pressure of 1.2 MPa, thereby obtaining the laminated glass used for sound insulation measurement.

The laminated glass, which was main-laminated was stabilized by being kept in a constant temperature and humidity chamber at 20° C. and a relative humidity of 20%, and after the stabilization, sound insulation performance of the laminated glass was measured.

(Evaluation)

Measurement of sound insulation was carried out as follows. Vibration was added to laminated glass by a vibration generator for DAMP test, the vibration characteristic obtained from this was amplified by a mechanical impedance measuring device, and the vibration spectrum was analyzed with an FFT spectrum analyzer to be calculated by a 1 dB method, thereby obtaining L/F (loss factor) values. It was evaluated as Pass if the value in Mode 4 was 0.34 or more or evaluated as Fail if the value in Mode 4 was less than 0.34.

(4) 2000 Hz Sound Transmission Loss Evaluation

Measurement was made according to KSF 2808:2011 standard. The laminated glass manufactured in a size of 1230 mm×1480 mm was constructed into a wall of corresponding standard, and placed in a center of a sound room, and after that, measurement was performed. Evaluation was made in an area of 2000 Hz, in which transmission coefficient was shown as the lowest when tested with a conventional film, and it was expressed as Pass when the value was 35.5 dB or more or expressed as Fail when the value was less than 35.5 dB.

In detail, STL values were evaluated by Equation 2 below, and the result values were shown in below Table 2.

$$R = L_1 - L_2 + 10\log\frac{S}{A} \quad \text{[Equation 2]}$$

where, the $L_1$ is average sound pressure level (dB, 100 dB was used) of a sound room, $L_2$ is average sound pressure level (dB) of a sound reception room, S is an area (m$^2$) of the sample, and A is sound power absorbing power (m$^2$) of the sound reception room.

in penetration resistance. However, Example 6 was evaluated as Fail in the sound insulation characteristic value at the measuring area, whose center thickness was 900 μm, and thus it was verified that, when a sound insulating layer was formed to be thin, sound insulation performance may be deficient.

In cases of Examples 1 to 3, it was verified that the penetration coefficient values of all of the samples were 1.35 kgf/mm$^2$*mm or more, even in a position, whose center thickness was 700 μm and considerably thin, and were also evaluated as Pass. Together with this, sound insulation performance by position was evaluated as Pass in all of the positions. Also, the thickness ratio was evaluated as about 13 to 24, such that forming a sound insulating layer (third layer) and a skin layer (first layer) in this thickness range was evaluated as the best for satisfying both sound insulation performance and penetration resistance.

For sound transmission loss, all of Examples 1 to 5 obtained a comparatively excellent result, and the results of Comparative Example 1, which was not applied with a sound insulating layer, and Example 6, in which a sound insulating layer was formed to be thin, were evaluated as Fail.

TABLE 2

| | Center Thickness of Measuring Area (μm) | Thickness of Each Layer (μm) | | Thickness Ratio of Third Layer** | Penetration Coefficient (kgf/mm$^2$*mm) | Penetration Resistance | Sound Insulation Performance by Position (L/F) | STL (dB) at 2000 Hz |
|---|---|---|---|---|---|---|---|---|
| | | Third Layer | The Sum of First Layer and Second Layer* | | | | | |
| Example 1 | 1200 | 174 | 1026 | 17.0 | 2.339 | pass | pass | 36 pass |
| | 900 | 142 | 758 | 18.7 | 1.732 | pass | pass | |
| | 700 | 102 | 598 | 17.1 | 1.363 | pass | Pass | |
| Example 2 | 1200 | 174 | 1026 | 17.0 | 2.566 | pass | pass | 36.2 pass |
| | 900 | 142 | 758 | 18.7 | 1.901 | pass | pass | |
| | 700 | 102 | 598 | 17.1 | 1.496 | pass | pass | |
| Example 3 | 1200 | 141 | 1059 | 13.3 | 2.165 | pass | pass | 35.5 pass |
| | 1000 | 118 | 882 | 13.4 | 1.804 | pass | pass | |
| | 800 | 100 | 700 | 14.3 | 1.434 | pass | pass | |
| Example 4 | 1200 | 174 | 1026 | 17.0 | 2.339 | pass | pass | 36.5 pass |
| | 900 | 174 | 726 | 24.0 | 1.673 | pass | pass | |
| | 700 | 174 | 526 | 33.1 | 1.229 | fail | pass | |
| Example 5 | 1200 | 140 | 1060 | 13.2 | 2.402 | pass | pass | 36.1 pass |
| | 900 | 140 | 760 | 18.4 | 1.736 | pass | pass | |
| | 700 | 140 | 560 | 25.0 | 1.292 | fail | pass | |
| Example 6 | 1200 | 50 | 1150 | 4.3 | 2.571 | pass | fail | 31.9 fail |
| | 900 | 50 | 850 | 5.9 | 1.905 | pass | fail | |
| | 700 | 50 | 650 | 7.7 | 1.461 | pass | fail | |
| Comparative Example 1 | 1200 | 0 | 1200 | 0.0 | 2.664 | pass | fail | 24.6 fail |
| | 900 | 0 | 900 | 0.0 | 1.998 | pass | fail | |
| | 700 | 0 | 700 | 0.0 | 1.554 | pass | fail | |

*The sum of the thickness of the first layer and the thickness of the second layer.
**The ratio of thickness (thickness ratio) of the third layer when the sum of the thickness of the first layer and the thickness of the second layer is designated as 100.

Referring to the results of the Table 2, when measured at a measuring area having a center thickness of 900 μm, which is a thickness less than about 975 μm (a middle value between 650 μm as a thickness of the film at the first end and 1300 μm as a thickness of the film at the second end), all Examples 1 to 6 had a penetration resistance coefficient of 1.35 kgf/mm$^2$*mm or more, and were also evaluated as Pass Property Prediction of Laminated Film (1) Tensile Properties of First Layer Sample and Third Layer Sample Depending on the Thickness The first layer film sample and the third layer film sample were manufactured by applying the same compositions as respective compositions of the first layer and the third layer in the Table 1 above with various thicknesses, such that respective tensile properties thereof were evaluated by the same method as above, and the results were shown in below Table 3.

TABLE 3

| Type of Resin for First Layer or Second Layer* | Amount of Plasticizer (wt %) | Thickness of Sample (μm) | Ultimate Tensile Strength (kgf/mm²) |
|---|---|---|---|
| Polyvinyl Butyral Resin (A) | 27 | 250 or more and less than 400 | 2.22 |
| | | 450 or more and less than 700 | 2.60 |
| | | 700 or more | 2.75 |
| Polyvinyl Butyral Resin (B) | 27 | 250 or more and less than 400 | 2.44 |
| | | 450 or more and less than 700 | 2.86 |
| | | 700 or more | 3.03 |
| Polyvinyl Butyral Resin (C) | 27 | 250 or more and less than 400 | 2.00 |
| | | 450 or more and less than 700 | 2.34 |
| | | 700 or more | 2.48 |

| Type of Resin for Third layer | Amount of Plasticizer (wt %) | Thickness of Section (μm) | Fracture Tensile Strength (kgf/mm²) |
|---|---|---|---|
| Polyvinyl Butyral Resin (D) | 35 | 50 or more and less than 100 | 0.35 |
| | | 100 or more and less than 200 | 0.35 |
| | | 200 or more | 0.34 |

*The amount of the resin was a remaining amount except the amount of the plasticizer based on the entire sample.
*The resin for the first layer and the resin for the second layer are the same with each other.

(2) The Results of Penetration Coefficient and Property Evaluation Depending on the Results of (1) Above Penetration coefficients were calculated by using the results of Table 3 above and the measured thicknesses presented in Table 2 above, and shown in Table 4 below.

TABLE 4

| | Center Thickness of Measuring Area (μm) | Penetration Coefficient (kgf/mm²*mm) | Penetration Resistance |
|---|---|---|---|
| Example 1 | 1200 | 2.692 | pass |
| | 900 | 1.920 | pass |
| | 700 | 1.363 | pass |
| Example 2 | 1200 | 2.692 | pass |
| | 900 | 1.852 | pass |
| | 700 | 1.229 | fail |
| Example 3 | 1200 | 2.767 | pass |
| | 1000 | 1.924 | pass |
| | 800 | 1.292 | fail |
| Example 4 | 1200 | 3.237 | pass |
| | 900 | 2.308 | pass |
| | 700 | 1.727 | pass |
| Example 5 | 1200 | 3.120 | pass |
| | 900 | 2.114 | pass |
| | 700 | 1.461 | pass |
| Example 6 | 1200 | 2.875 | pass |
| | 900 | 2.048 | pass |
| | 700 | 1.450 | pass |
| Comparative Example 1 | 1200 | 2.576 | pass |
| | 900 | 2.068 | pass |
| | 700 | 1.644 | pass |

Referring to the results of Table 4 above, when compared to the results of the penetration coefficients of Table 3, the laminated film, whose first end and second end were different in the thickness, particularly in portions where the center thickness were small, had a small difference between the measured value and the calculated value. Also, it could be verified that, which is also confirmed by the results of Table 2, when a penetration coefficient was about 1.35 kgf/mm²*mm or less, it was not good in penetration resistance evaluation.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A laminated film for bonding, comprising:
a first layer;
a second layer disposed opposite to the first layer; and
a third layer interposed between the first layer and the second layer,
wherein the laminated film comprises a first end having a first thickness and a second end opposite to the first end in a width direction of the laminated film and having a second thickness different from the first thickness, and a measuring area disposed between the first end and the second end and having a center thickness, which is a thickness at a center of the measuring area,
wherein the center thickness is less than or equal to a middle value of the first thickness and the second thickness,
wherein a penetration coefficient ($F_{pe}$) measured by the following Equation 1 at the measuring area is 1.35 kgf/mm²*mm or more:

$$F_{pe} = T_1 \times UTS + T_2 \times TS \quad \text{[Equation 1]}$$

where, $F_{pe}$ is the penetration coefficient (kgf/mm²*mm), UTS is a sum of an ultimate tensile strength (kgf/mm²) of the first layer at the measuring area and an ultimate tensile strength of the second layer at the measuring area, TS is a fracture tensile strength (kgf/mm²) of the third layer at the measuring area, $T_1$ is a sum (mm) of the center thickness of the first layer at the measuring area and the center thickness of the second layer at the measuring area, and $T_2$ is the center thickness (mm) of the third layer at the measuring area, wherein, a ratio at the center thickness of a sum of a thickness of the first layer and a thickness of the second layer to a thickness of the third layer is 100:12 to 24, and wherein at all measuring areas disposed between the first end and the second end, $F_{pe}$ is 1.35 kgf/mm$^2$*mm or more and a ratio at each respective thickness of a sum of a thickness of the first layer and a thickness of the second layer to a thickness of the third layer is 100:12 to 24.

2. The laminated film for bonding of claim 1, wherein the first thickness is thinner than the second thickness.

3. The laminated film for bonding of claim 1, wherein the thickness of the third layer at the first end of the laminated film for bonding is thinner than the thickness of the third layer at the second end of the laminated film for bonding.

4. The laminated film for bonding of claim 1 comprising: a first surface and a second surface disposed opposite to the first surface, wherein the laminated film for bonding comprises a first line and a second line, wherein the first line is a virtual line connecting the first end and the second end on the first surface, and the second line is a virtual line connecting the first end and the second end on the second surface, and wherein an angle at a point of contact of the first line and the second line is 1 degree or less.

5. The laminated film for bonding of claim 1, wherein when the first thickness is 0% and the second thickness is 100%, the center thickness of the measuring area is 35% or less.

6. The laminated film for bonding of claim 1, wherein a loss factor value at the measuring area is 0.34 or more.

7. The laminated film for bonding of claim 1, wherein a sound transmission loss value measured at 2000 Hz is 35.5 dB or more.

8. The laminated film for bonding of claim 1, wherein the thickness of the third layer at the first end is 60 μm or more.

9. The laminated film for bonding of claim 1, wherein the sum of the thickness of the first layer at the first end and the thickness of the second layer at the first end is more than 560 μm.

10. The laminated film for bonding of claim 1, wherein the first layer comprises a polyvinyl acetal resin having a hydroxyl group in an amount of 15 wt % or more based on a total weight of the polyvinyl acetal resin.

11. The laminated film for bond of claim 1, wherein the second layer comprises a polyvinyl acetal resin having a hydroxyl group in an amount of 15 wt % or more based on a total weight of the polyvinyl acetal resin.

12. The laminated film for bonding of claim 1, wherein the third layer comprises a polyvinyl acetal resin having a hydroxyl group in an amount of 9.5 wt % or less based on a total weight of the polyvinyl acetal resin.

13. A light transmitting laminate comprising:
a first light transmission layer;
the laminated film for bonding of claim 1 disposed on one side of the first light transmission layer; and
a second light transmitting laminate disposed on the laminated film for bonding.

14. The light transmitting laminate of claim 13, wherein a sound transmission loss value measured at 2000 Hz is 35.5 dB or more.

15. The light transmitting laminate of claim 13, wherein a penetration does not occur in a penetration resistance test of 5.5 m in accordance with KS L 2007.

16. The laminated film for bonding of claim 1, wherein the total thickness of the laminated film is 1,300 μm or less.

* * * * *